United States Patent [19]

Tanabe et al.

[11] Patent Number: 5,047,081
[45] Date of Patent: Sep. 10, 1991

[54] METHOD OF DECARBURIZING HIGH CHROMIUM MOLTEN METAL

[75] Inventors: Haruyoshi Tanabe; Masahiro Kawakami; Kenji Takahashi; Katsuhiro Iwasaki; Shigeru Inoue, all of Tokyo, Japan

[73] Assignee: NKK Corporation, Tokyo, Japan

[21] Appl. No.: 320,270

[22] PCT Filed: Sep. 9, 1988

[86] PCT No.: PCT/JP88/00909
§ 371 Date: Apr. 5, 1989
§ 102(e) Date: Apr. 5, 1989

[87] PCT Pub. No.: WO89/02479
PCT Pub. Date: Mar. 23, 1989

[30] Foreign Application Priority Data

Sep. 9, 1987 [JP] Japan .................. 62-224048
Sep. 17, 1987 [JP] Japan .................. 62-231042
Nov. 13, 1987 [JP] Japan .................. 62-285444
Dec. 26, 1987 [JP] Japan .................. 62-330979

[51] Int. Cl.$^5$ .................................... C21C 7/10
[52] U.S. Cl. ............................ 75/555; 75/512
[58] Field of Search .............. 75/512, 555, 59.2

[56] References Cited

U.S. PATENT DOCUMENTS 3,854,932 12/1974 Bishop .................. 75/512
4,514,220 4/1985 Tommaney .............. 75/555
4,592,778 6/1986 Fujii ...................... 75/555

Primary Examiner—Peter D. Rosenberg
Attorney, Agent, or Firm—Moonray Kojima

[57] ABSTRACT

The present invention relates to a method which may decarburize high Cr molten metal for a short period of time under an atmospheric pressure, while checking loss of Cr by its oxidation. A basic feature of the invention is to blow from the furnace top lance a decarburizing $O_2$ diluted by an inert gas into the high Cr molten metal supported in a container as well as blow the inert gas from bottom tuyeres so as to forcibly agitate the molten metal. Another feature of the invention is to control a slag amount during the above decarburizing blowing so as to check the Cr oxidation loss. A further object of the invention is to carry out a denitrification in the above decarburization, thereby to produce low N molten metal while checking the loss by Cr oxidation.

29 Claims, 5 Drawing Sheets

FIG_1
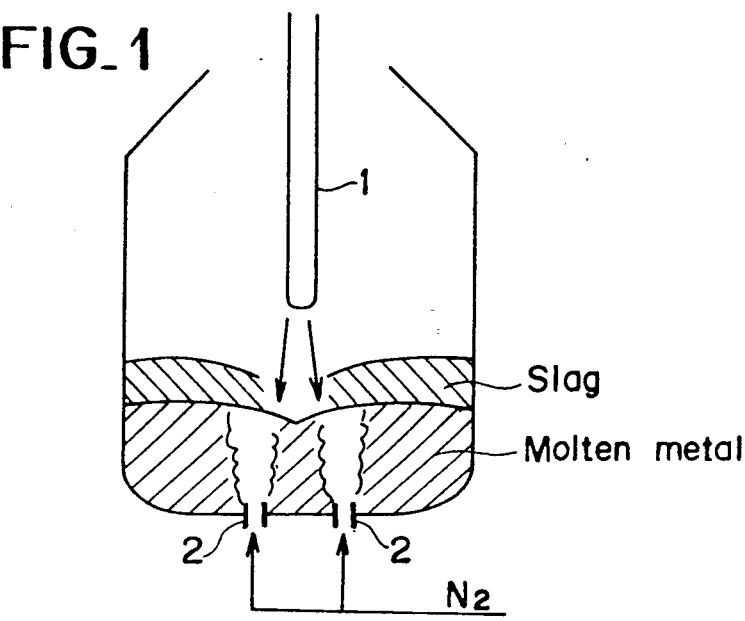
FIG_7
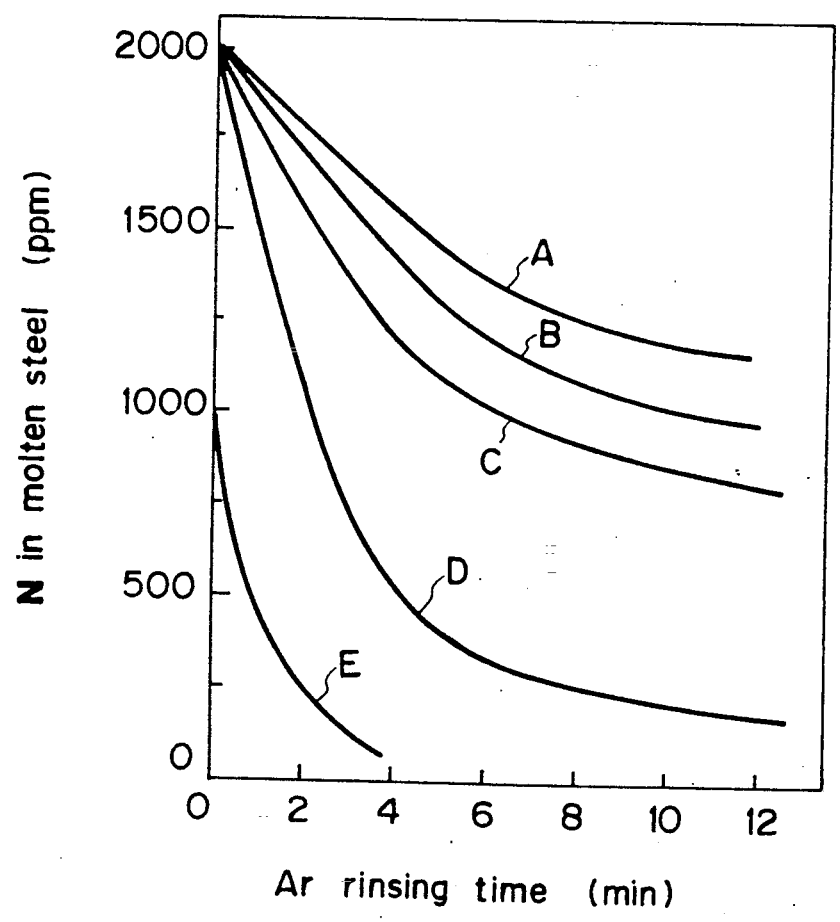

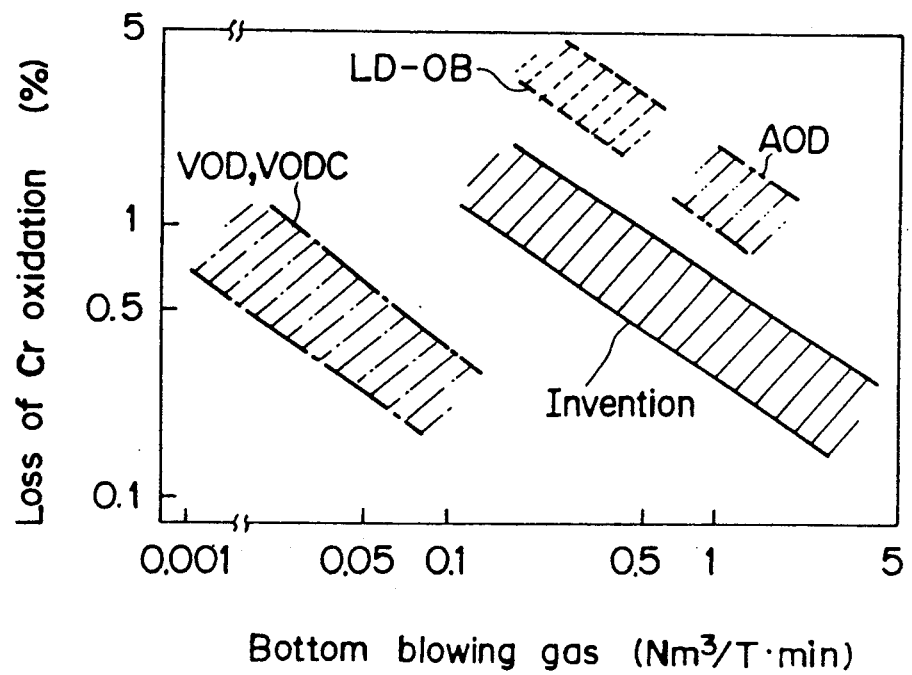
FIG_2
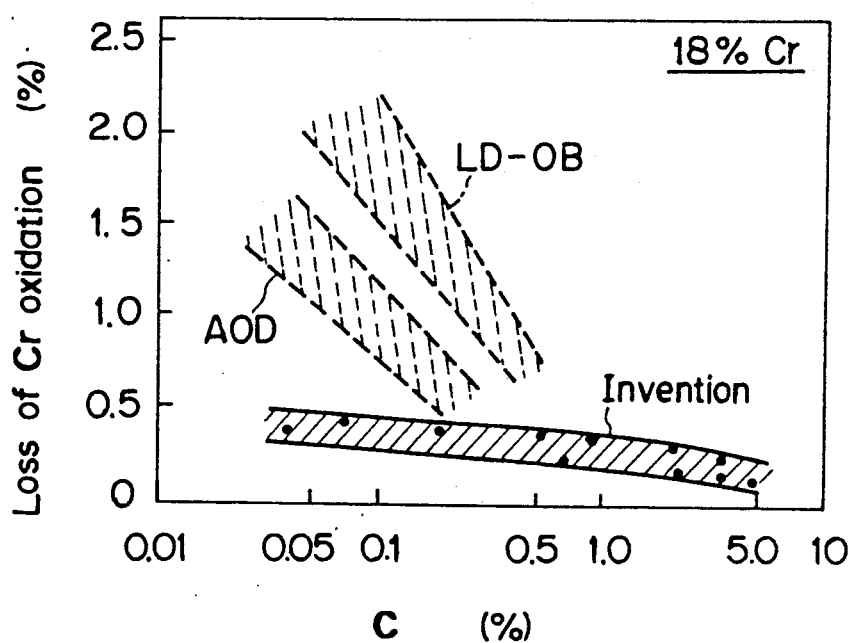
FIG_4

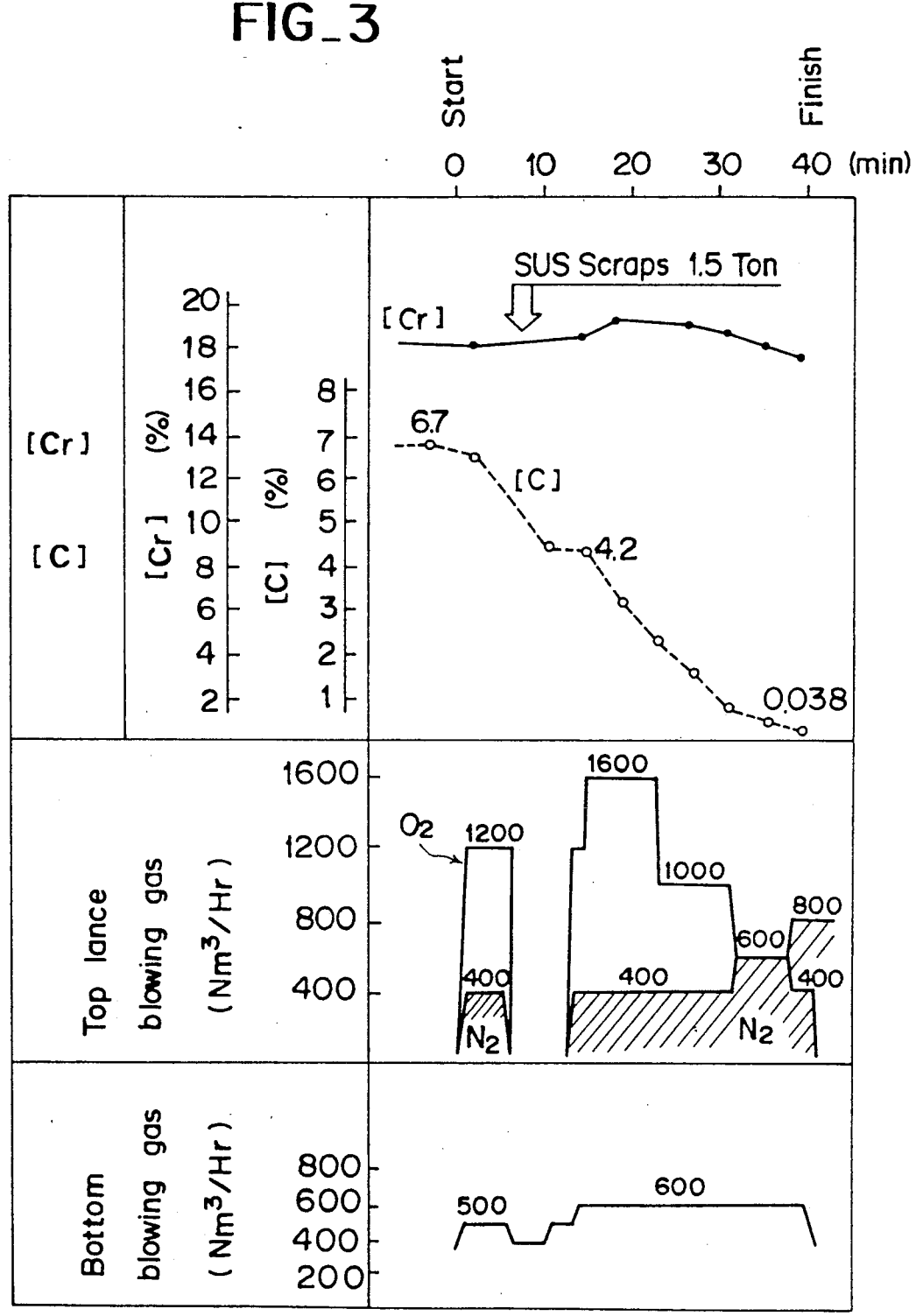
FIG_3

FIG_5
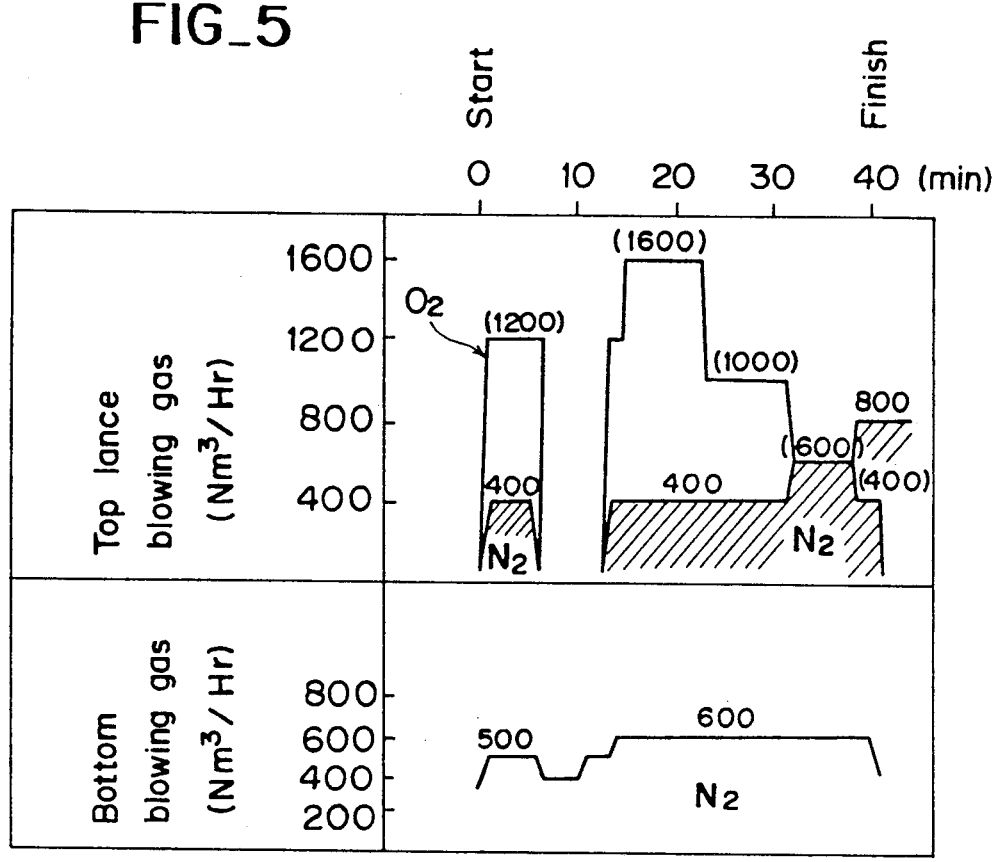
FIG_6
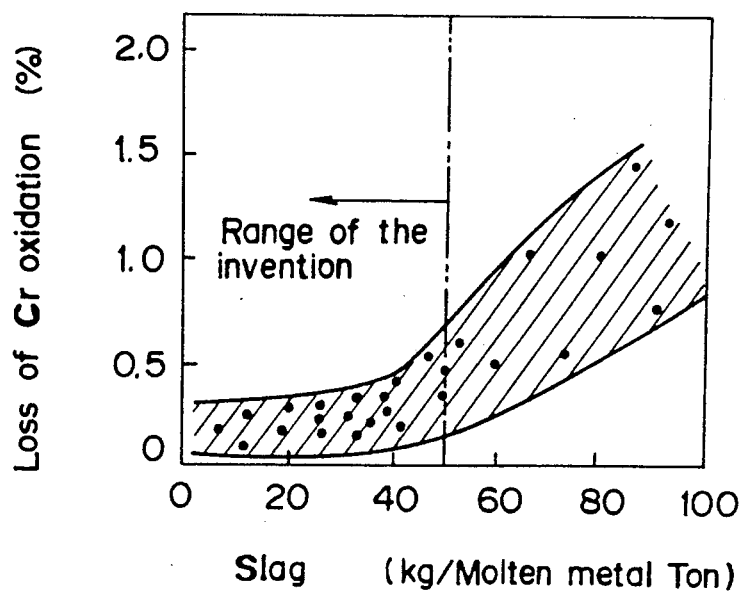

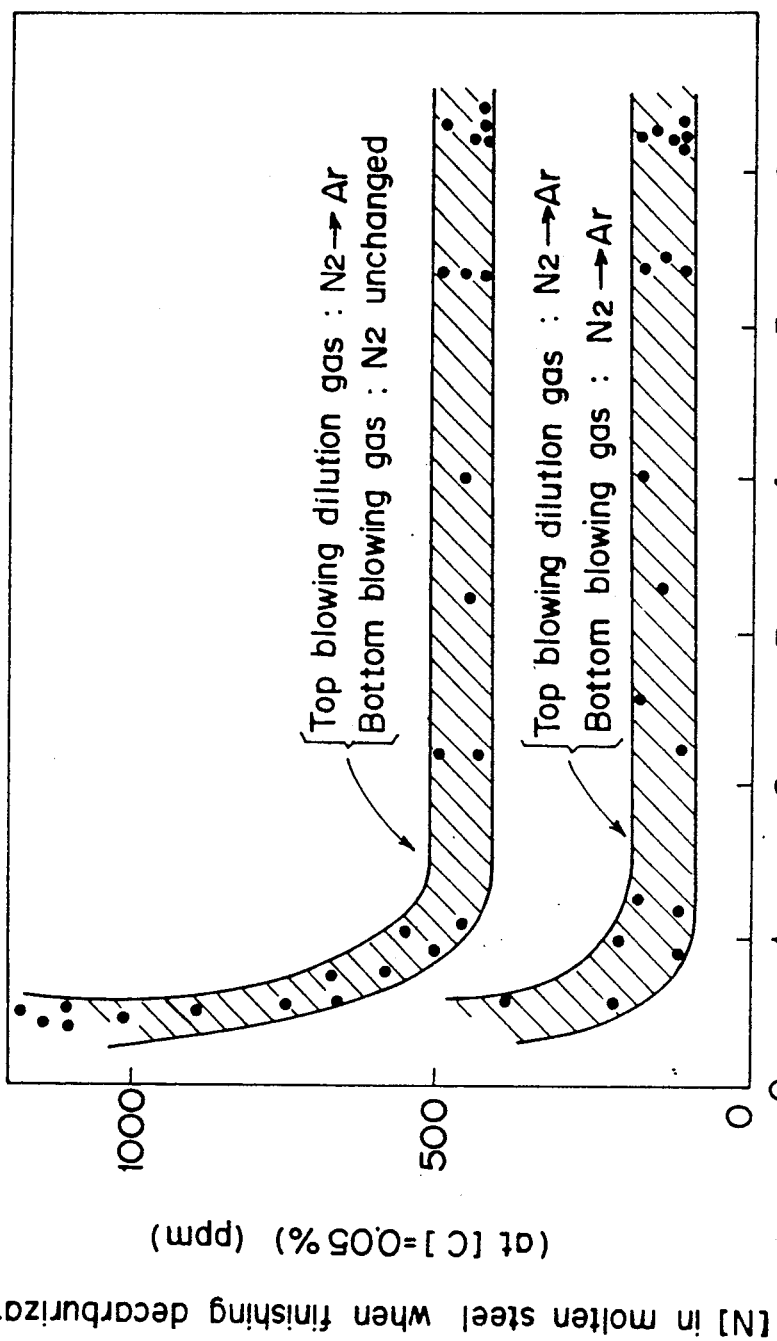

METHOD OF DECARBURIZING HIGH CHROMIUM MOLTEN METAL

TECHNICAL FIELD

This invention relates to a method of decarburizing high Cr molten metal.

BACKGROUND OF THE INVENTION

There have been conventional decarburizing methods of high Cr molten metal known as AOD, VOD, VODC or RH-OB processes. In AOD, a mixed gas of oxygen and an inert gas from a furnace bottom is blown under an atmospheric pressure. In VOD and VODC, $O_2$ is blown under a vacuum, and in RH-OB, a rough decarburization is performed in a converter, and subsequently a vacuum $O_2$ blowing is carried out in a RH degasfying chamber.

However, since in the AOD process, the decarburization is carried out in the air and $O_2$ is blown directly into the molten metal, loss of Cr by its oxidation (called as "Cr oxidation loss" hereinafter) is large, and it is disadvantageous that much Fe—Si or Al must be thrown into a slag as a reducing agent.

In the VOD, VODC and RH-OB processes, the decarburization is undertaken in the vacuum with less Cr oxidation loss, but since much oxygen is necessary for securing productivity, a vacuum facility of a large capacity therefor is required at high cost.

Also when the high Cr molten metal is decarburized by blowing in the air, the inert gas is much required to agitate the molten metal. Ordinarily available gases therefor are $N_2$ and Ar. If a low nitrogen stainless steel is produced, $N_2$ cannot be used because it increases N concentration in steel, and an expensive Ar must be used. If Ar were much used, a problem would arise about the production cost. From such a viewpoint, the production of the low nitrogen steel usually depends upon a vacuum blowing, by which the denitrification takes place easily.

For these foregoing problems, the present invention has been devised. It is a basic object of the invention to provide a method which could perform the decarburization in a short period of time without practising the vacuum decarburization and with checking Cr oxidation loss.

It is the other object of the invention to provide a method which could decrease N in steel, not using much Ar, thereby to enable production of low nitrogen stainless steel at low production cost.

OUTLINE OF THE INVENTION

For accomplishing these objects, to high Cr molten metal supported in a container having bottom blowing tuyeres and a top blowing lance, the invention blows decarburizing $O_2$ diluted with the inert gas from the top lance, as well as blows the inert gas from the bottom tuyeres so as to agitate the molten metal complusively.

According to this method, the decarburization can be finished in a short time under the atmospheric pressure with checking the Cr oxidation loss.

In the AOD process, $O_2$ is blown from the bottom tuyeres. It has been found through the inventors' studies that $O_2$ blown from the bottom largely increased the Cr oxidation loss. That is, since static pressure was added in the $O_2$ bottom blowing practice CO partial pressure was increased, and as a result the decarburizing reaction was hindered and $O_2$ oxidizes Cr. Therefore, the invention blew $O_2$ not from the bottom tuyeres but from the top lance.

However, it was found that, if the top blowing were merely made with pure $O_2$, the Cr oxidation loss could not be avoided exactly. This is why the decarburizing reaction takes place most vigorously around a fire point made by blowing oxygen from the lance, but with $O_2$ only, CO partial pressure becomes very high there, and the decarburizing reaction is obstructed and $O_2$ oxidizes Cr. Thus, the invention blows $O_2$ diluted with the inert gas ($N_2$ or Ar) from the top lance, thereby to decrease CO partial pressure around the fire point and accelerate the decarburizing reaction.

Further, in the invention, the inert gas ($N_2$ or Ar) is blown from the bottom tuyeres to forcibly agitate the molten metal and accelerate the mixture of the molten metal and $O_2$ sent from the top lance, and the effective decarburization is possible with checking the Cr oxidation loss by combination of the compulsive agitation of the metal by the inert gas from the bottom and the top blowing of $O_2$ diluted by the inert gas.

In the above decarburization blowing, it is effective for controlling the Cr oxidation loss to increase the inert gas gradually on the half way of blowing, while squeezing the amount of the decarburizing $O_2$.

There is a cross relationship between the slag amount and the Cr oxidation loss during decarburizingly blowing, and if the blowing is carried out by maintaining the slag amount not more than 50 kg/molten metal ton, the Cr oxidation loss can be controlled effectively.

Especially in the production of the low nitrogen stainless steel, a decarburizing method is provided in the invention, which could control N in the steel to be low without using much Ar gas, not only checking the Cr oxidation loss. A first way therefor throws a deoxidizer as Fe—Si or Al after having finished the decarburization, and agitates the molten steel by blowing Ar from the bottom tuyeres, thereby to remove N in the steel in addition to Cr reduction and deoxidation.

A second way blows the decarburizing $O_2$ diluted with Ar from the top lance into the high Cr molten metal, as well as blows $N_2$ from the bottom tuyeres to forcibly agitate the metal and throws, after the above blowing, Fe—Si or Al, and agitates the metal by Ar from the bottom tuyeres.

If Ar is employed as a diluting gas of the decarburizing $O_2$, N-absorption may be controlled around the fire point where N is most absorbed.

A third way blows from the top lance the decarburizing $O_2$ diluted by $N_2$, and blows $N_2$ from the bottom tuyeres so as to agitate the metal, so that the decarburization is started and the diluting gas is changed from $N_2$ to Ar during decarburization, and after having finished the blowing, the deoxidizer such as Fe—Si or Al is thrown into the metal and Ar is blown from the furnace bottom to effect agitation. A fourth way changes the bottom blowing gas from $N_2$ to Ar, not only the dilution gas on the half way of decarburization in the above stated third way.

In the blowing, at beginning of the blowing when the decarburizing reaction is vigorous, N in the steel is low, but at ending thereof when the decarburization advances and the decarburizing speed becomes slow N in the steel becomes high remarkably. According to the third and fourth ways, N in the steel may be lowered, while the using amount of Ar is controlled to be low.

BRIEF DESCRIPTION OF THE DRAWINGS

FIG. 1 shows schematically a priciple of the present method;

FIG. 2 shows relation between the amount of bottom blowing gas and the Cr oxidation loss in the inventive method and the existing methods;

FIG. 3 shows changings as time passes, of Cr and C concentrations in the molten metal, the amount of top lance blowing gas and the amount of bottom blowing gas in Example 1;

FIG. 4 shows relation between decarburizing level and the Cr oxidation loss in the invention;

FIG. 5 shows the gas blowing conditions in Example 2;

FIG. 6 shows influences of the slag amount to the Cr oxidation loss in Example 2;

FIG. 7 shows influences of the bottom blowing Ar gas amount to the denitrifying speed during Ar rinsing in Example 3

FIG. 8 shows relation between C in the molten steel when the top blowing dilution gas and the bottom blowing gas are changed from $N_2$ to Ar, and N in the steel after having finished the blowing.

In the drawings, 1 designates a furnace top blowing lance and 2 shows furnace bottom blowing tuyeres.

DETAILED DESCRIPTION OF THE INVENTION

The invention will be explained in detail.

FIG. 1 shows schematically the inventive method, where 1 is a top blowing lance, and 2 is bottom blowing tuyeres.

In the present invention, the decarburization is carried out under the atmospheric pressure.

(1) $O_2$ is supplied exclusively from the top blowing lance 1, and is not blown from the furnace bottom.

(2) The top blowing lance 1 supplies not pure $O_2$ but $O_2$ diluted by the inert gas.

(3) The bottom blowing tuyeres 2 supply the inert gas to forcibly agitate the molten metal.

For forcibly agitating the molten metal, it is necessary to blow much the inert gas. Actually, for decreasing the Cr oxidation loss until not more than 1%, it is necessary to blow the gas of more than 0.5 $Nm^3$/ton-min. (ton-min.: every minute per 1 ton of molten metal), and for decreasing the Cr oxidation loss until not more than 0.5%, it is necessary to blow the gas of more than 1 $Nm^3$/ton-min. Only, if the gas amount were too much, the molten metal would be splashed. Therefore, the invention blows the gas of 0.5 to 5 $Nm^3$/ton-min, preferably 1 to 3 $Nm^3$/ton-min. FIG. 2 shows the relation between the amount of the bottom blowing gas and the Cr oxidation loss (C in the molten metal when the blowing is acomplished: around 0.05%). $O_2$ is used effectively to the decarburizing reaction by much blowing the gas from the bottom, and the Cr oxidation loss is checked appropriately. For comparison, the same shows cases of the existing methods, and in the AOD for example, the Cr oxidation loss is very large with respect to the amount of the bottom blowing gas.

It is preferable to supply much oxygen from the top lance for shortening the treating time.

The high Cr molten metal to be treated by the invention is produced by melting ferrochromium or a so-called direct molten reduction.

In the invention, an entire process from producing of Cr molten metal to producing of stainless steel may be performed in the same container rationally and at high productivity by decarburizing as mentioned above Cr molten metal produced by any of the above mentioned processes.

In the above decarburization blowing, for exactly avoiding the Cr oxidation loss, it is effective to squeeze the oxygen supply amount in accordance with decreasing of C level. However, in supplying oxygen from the top blowing lance, it is limited in view of lowering the blowing pressure to squeeze the supplying amount in the same nozzle, and the supplying amount is squeezed down to about ½ to the maximum.

For dealing with the above mentioned problem, it is preferable to increase gradually the diluting inert gas on the half way of the blowing in accordance with the decarburizing progress, and squeeze the amount of blowing the gas, thereby to enable to squeeze the oxygen supplying amount without lowering the blowing pressure extremely.

Increasing of the inert gas and squeezing of the oxygen supplying amount may be operated successively or stepwise. With respect to the gas blowing, for example, the blowing gas amount ($O_2+N_2$ or Ar) from the top lance is determined to be always 3 $Nm^3$/ton-min, and the oxygen supplying amount is squeezed as follows in response to C level.

C: more than 3% ... 3 to 4 $Nm^3$/ton-min.
C: less than 3% to 2% ... 2 to 3 $Nm^3$/ton-min.
C: less than 2% to 0.5% ... 1 to 2 $Nm^3$/ton-min.
C: less than 0.5% ... 1 $Nm^3$/ton-min.

C in the molten metal during blowing can be known by assumption by the integrating oxygen amount or measuring of solidifying temperature of the sampling molten metal.

EXAMPLE 1

18% Cr molten metal of 5.5 ton was decarburized in the container. FIG. 3 shows changings of Cr and C concentrations and the gas blowing amount. In the present practice, C was decarburized from 6.7% to 0.038% for about 40 minutes. In spite of such decarburization to low carbon as seen therein, the Cr oxidation loss shows very low as about 0.5%.

Further, the relationship between the decarburizing level and the Cr oxidation loss was studied by changing the decarburizing level (the conditions were almost the same as FIG. 3). FIG. 4 shows the results thereof in comparison with the foregoing ways (AOD and LD-OB processes). It is seen that the Cr oxidation loss is controlled to be low enough in the invention (slag amount: about 40 kg/molten metal ton).

In the conventional decarburization, Fe—Si was thrown as the reducing agent into the slag to check the Cr oxidation loss. However Si increased thereby, and was desiliconized in a subsequent decarburizion and it generated an oxidizing slag very halmful to refractories. Therefore, CaO was thrown as a neutralizer into the slag to prevent the refractory from wearing, and in this operation the slag was generated inevitably.

In the LD-OB process, coal materials were supplied as a heat source, and S concentration became high. Therefore, after the decarburization, the desulfurization was necessary together with reduction of oxidized Cr, and the slag was much required for increasing desulfurization.

The conventional decarburization blowing was performed under the condition of forming much the slag, and the influences of the slag amount to the Cr oxidation loss were not studied carefully and quantitatively.

On the other hand, the inventors made studies on the relations between the slag amount and the Cr oxidation loss, paying attention to the slag to be much formed. As a result, it was found that the cross relationship existed between the slag amount and the Cr oxidation loss during decarburizingly blowing, and if the blowing was done as controlling the slag amount to be low, that is, not more than 50 kg/molten metal ton, the Cr oxidation loss could be lowered effectively.

In the invention, it is assumed that the Cr oxidation loss is lowered by controlling the slag amount within the above mentioned range for reasons as follows. $O_2$ blown from the top lance causes reactions as mentioned under.

$$C \text{ (molten metal)} + \tfrac{1}{2} O_2 = CO \text{ (gas)} \quad (2)$$

$$2Cr \text{ (molten metal)} + 3/2\, O_2 = Cr_2O_3 \text{ (slag)} \quad (2)$$

From the above formulas (1) and (2), an under formula (3) will be built.

$$Cr_2O_3 \text{ (slag)} + 3C \text{ (molten metal)} = \\ 2Cr \text{ (molten metal)} + 3CO \text{ (gas)} \quad (3)$$

$Cr_2O_3$ generated by the top lance blowing $O_2$ is reduced by C in the molten metal.

It is important to increase the concentration of $Cr_2O_3$ in the slag for progressing the reduction of the formula (3) to the right side. For heightening the $Cr_2O_3$ concentration, it is effective to decrease the amount of the whole slag, so that the reaction of the formula (3) is made easily, and as a result, the reduction of $Cr_2O_3$ is accelerated and the Cr loss is decreased effectively. In addition, MgO composes the furnace refractory (magnesium chromium, magnesium carbon or magnesium dolomite), and the slag contains MgO around 10 to 30% by melting it. Since MgO combines with $Cr_2O_3$ and generates less fusable $MgO \cdot Cr_2O_3$ spinel, and if the slag amount is much, $Cr_2O_3$ concentration in the slag is lowered, and the reducing is difficult. The lowering effect of the Cr oxidation loss by lowering the slag amount was most remarkable when the blowing was done with the slag amount of not more than 50 kg/molten metal ton.

For practising the present method, the lesser are Si and S contents in the molten steel to be decarburized, the more advantageous is controlling (lowering) of the slag amount. In this point, in the basic decarburization of the invention, the addition amount of the reducing agent as Fe—Si can be controlled to be low, and the slag amount can be easily controlled.

EXAMPLE 2

18% Cr molten metal of 5.5 ton was decarburized in the container in accordance with the different levels of the slag amounts gas blowing amount. The decarburization was carried out by blowing the decarburizing $O_2$ diluted by $N_2$ gas from the top lance and blowing $N_2$ gas from the bottom tuyeres and C in the molten metal was decreased from 6.5% to 0.03% for about 40 min. FIG. 5 shows the amount of the blown gas in this operation.

FIG. 6 shows the relation between the slag amount and the Cr oxidation loss obtained in this treatment. The Cr oxidation loss became low as the slag amount became low. When the slag amount ≤50 kg/molten metal ton (preferably, ≤40 kg/molten metal ton), the Cr oxidation loss lowered remarkably.

The inventors made studies on the denitrification of the molten steel when the low nitrogen stainless steel was produced, on a premise that $N_2$ was used as the agitating gas at decarburization, and found that it was very effective to nitrification of the molten metal that the deoxidizer as Fe—Si or Al was thrown after the decarburization for carrying out the rinsing treatment by much blowing Ar from the bottom tuyeres.

In general, Fe—Si or Al are thrown into the molten metal for deoxidation and Cr reduction in the slag after the decarburization, and in this regard, the agitation is practised by blowing Ar from the bottom together with said throwing of the deoxidizer, whereby N is removed from the molten steel in addition to the above mentioned Cr reduction and deoxidation. This is why N is made easy to escape together with deoxidation of the molten steel (70 to 150 ppm-less than 50ppm) by adding Fe—Si or Al, and if the molten steel is agitated by Ar, N is made easier to run away.

The above said Ar bottom blowing is performed ordinarily 0.5 to 5 Nm3/min.-molten steel ton, preferably 1 to 3 Nm3/min.-molten metal ton, for 5 to 10 minutes.

For more lowering N in the molten steel, in addition to the above denitrification rinsing treatment, it is preferable to use Ar gas as the diluting gas of the decarburizing $O_2$, though $N_2$ is used as the bottom blowing gas at decarburizingly blowing. Since N-absorption is most vigorous around the fire point of the lance, and if $N_2$ is used as the dilution gas, much N is molten into the steel. But, in this method, since Ar is more expensive than N, Ar is used only for the dilution gas which is enough with a little amount so as to check the increasing of the nitrogen concentration. After decarburizingly blowing the above nitrification is carried out.

The inventors found that, with respect to N in the molten steel, while the decarburization is vigorous, N is low, and when the decarburization progresses and the decarburizing speed is lower, N becomes higher remarkably. This is why CO gas generated by the decarburization absorbs N and releases it.

The higher is the C concentration in the steel, the faster is the decarburizing speed. The diluting gas of the decarburizing $O_2$ is used, and $N_2$ gas is used at first, and when C becomes low on the half way of decarburization, the diluting gas of the decarburizing $O_2$ is changed from $N_2$ to Ar and the decarburization is continued, so that the production cost can be lowered appropriately.

It is preferable to change the diluting gas of the decarburization $O_2$ and the bottom blowing gas from $N_2$ to Ar in accordance with the amount of C in the molten steel, actually, as show in FIG. 8, $N_2$ to Ar changing is desirous in the range of 0.8 to 2.0% C in the molten steel. If the changing is too early, the expensive Ar gas is required so much. Therefore, the changing be made when C is below 2.0%. On the other hand, if the changing is too late (C concentration is too low), as shown in FIG. 8 the denitrification is unsatisfactory. So, the changing be done when C is above 0.8%.

EXAMPLE 3

The high Cr molten metal was decarburized by under mentioned (A) to (E) manners in the container having the top blowing lance and the bottom blowing tuyeres, followed by Ar rinsing (Fe—Si supply + Ar bottom blowing), and the stainless molten steel of Cr: 18% and C: 0.05% was produced.

(A) Decarburizingly blowing
Top blowing gas: $O_2 + N_2$ (Dilution)
Bottom blowing gas: $N_2$ (2 $Nm^3$/min.-molten steel ton)
Ar rinse
Bottom blowing gas: Ar (0.1 $Nm^3$/min.-molten metal ton)

(B) Decarburizingly blowing
Top blowing gas: $O_2 + N_2$ (Dilution)
Bottom blowing gas: $N_2$ (2 $Nm^3$/min.-molten steel ton)
Ar rinse
Bottom blowing gas: Ar (0.5 $Nm^3$/min.-molten metal ton)

(C) Decarburizingly blowing
Top blowing gas: $O_2 + N_2$ (Dilution)
Bottom blowing gas: $N_2$ (2 $Nm^3$/min.-molten steel ton)
Ar rinse
Bottom blowing gas: Ar (1 $Nm^3$/min.-molten metal ton)

(D) Decarburizingly blowing
Top blowing gas: $O_2 + N_2$ (Dilution)
Bottom blowing gas: $N_2$ (2 $Nm^3$/min.-molten steel ton)
Ar rinse
Bottom blowing gas: Ar (2 $Nm^3$/min.-molten metal ton)

(E) Decarburizingly blowing
Top blowing gas: $O_2 + Ar$ (Dilution)
Bottom blowing gas: $N_2$ (2 $Nm^3$/min.-molten steel ton)
Ar rinse
Bottom blowing gas: Ar (2 $Nm^3$/min.-molten metal ton)

FIG. 7 shows the influences of the amount of gas blown from the bottom to the denitrifying speed during Ar rinsing. In any way, the molten metal is denitrified effectively by Ar rinse. In (D) case, where Ar gas is 2 $Nm^3$/min.-molten steel ton, the denitrification reaches an objective value of N: 500 to 600 ppm for the rinsing time of 4 to 5 min. In (E) case where Ar is used as the $O_2$ diluting gas at decarburization, N concentration is about 1000 ppm of half of (A) to (D) cases when the decarburization is finished, and therefore the denitrification reaches the objective value by the Ar rinsing for shorter period of time.

EXAMPLE 4

The high Cr molten metal was decarburized by under mentioned (a) and (b) manners in the container having the top blowing lance and the bottom blowing tuyeres, followed by Ar rinsing (Fe—Si supply + Ar bottom blowing), and the stainless molten steel of Cr: 18% and C: 0.05% was produced.

(a) Decarburizingly blowing
Top blowing gas: $N_2$ was used as the dilution gas of the decarburizing $O_2$ at the beginning of decarburization, and changed to Ar in accordance with values of C in the molten steel during decarburizingly blowing.
Ar rinse
Ar supply: 2 $Nm^3$/min.-molten steel ton for 5 minutes (b) Decarburizingly blowing
Top blowing gas: $N_2$ was as the dilution gas of the decarburizing $O_2$ and the bottom blowing gas at the beginning of decarburization, and changed to Ar in accordance with values of C in the molten steel during decarburizingly blowing.
Ar rinse
Ar supply: 2 $Nm^3$/min.-molten steel ton for 5 minutes FIG. 8 shows the influences to N in the molten steel when changing the gas sorts of the dilution gas of the decarburizing $O_2$ and the bottom blowing gas.

Table 1 shows the concentrations of N in the steel after the Ar rinsing (changing of $N_2$ - Ar during decarburizingly blowing was done at C in the molten steel = 1%), and it is seen that the low N stainless steel of below 200 ppm is easily produced according to the invention.

TABLE 1

| | N in the molten steel after decarburizingly blowing | N in the molten steel after Ar rinsing |
|---|---|---|
| (a) | 500 ppm | 130 ppm |
| (b) | 150 ppm | 50 ppm |

INDUSTRIAL APPLICABILITY

The present invention is applicable to the decarburization of the high Cr molten metal which has generally been produced by melting ferrochromium. Recently, there has been proposed so-called molten metal reduction method which directly obtains the high Cr molten metal from Cr ore or Cr ore pellets, and this invention may be applied to decarburizion blowing for the high Cr molten metal obtained by the molten reduction.

What is claimed is:

1. A method of decarburizing Cr molten metal, comprising the steps of
    blowing, into a Cr molten metal supported in a container having a bottom blowing tuyere and a top blowing lance, a decarburizing $O_2$ diluted with an inert gas from said top lance; and
    blowing, into said Cr molten metal, an inert gas in an amount ranging from 1 to 5 $Nm^3$/molten metal ton-min from said bottom blowing tuyere so as to agitate the Cr molten metal.

2. The method of claim 1, wherein the amount of inert gas blown from said bottom blowing tuyere is between 1 to 3 $Nm^3$/molten metal ton-min.

3. A method of decarburizing Cr molten metal, comprising the steps of
    blowing, into a Cr molten metal supported in a container having a bottom tuyere and a top lance, a decarburizing $O_2$ diluted with an inert gas from said top lance;
    blowing, into said Cr molten metal, an inert gas from said bottom tuyere so as to agitate said Cr molten metal; and
    maintaining a slag amount of not more than 50 Kg/molten metal ton.

4. The method of claim 3, wherein the amount of inert gas blown from said bottom tuyere is more than 0.5 $Nm^3$/molten metal ton-min.

5. The method of claim 3, wherein the amount of inert gas blown from said bottom tuyere is more than 1 $Nm^3$/molten metal ton-min.

6. The method of claim 1, or 3, wherein the Cr molten metal is produced by melting ferrochromium in said container.

7. A method of decarburizing Cr molten metal, comprising the steps of
    blowing, into a Cr molten metal supported in a container having a bottom tuyere and a top lance, a decarburizing $O_2$ diluted with an inert gas from said top lance;
    blowing, into said Cr molten metal, $N_2$ gas from said bottom tuyere so as to agitate said cr molten metal for producing stainless steel;
    thereafter supplying a deoxidizer of fe—Si or Al into said Cr molten metal; and agitating by blowing Ar from said bottom tuyere.

8. A method of decarburizing Cr molten metal, comprising the steps of blowing, into a Cr molten metal supported in a container having a bottom tuyere and a top lance, a decarburizing $O_2$ diluted with an inert gas from said top lance;

blowing, into said Cr molten metal, $N_2$ gas from said bottom tuyere so as to agitate said Cr molten metal for producing stainless steel;

maintaining a slag amount of not more than 50 Kg/molten metal ton;

supplying a deoxidizer of Fe—Si or Al into said Cr molten metal; and agitating by blowing Ar from said bottom tuyere.

9. The method of claim 7 or 8, wherein the $N_2$ gas is blown from said bottom tuyere in an amount of more than 0.5 $Nm^3$/molten metal ton-min.

10. The method of claim 7, or 8, wherein the $N_2$ gas is blown from said bottom tuyere in an amount of more than 1 $Nm^3$/molten metal ton-min.

11. The method of claim 7 or 8, wherein the Ar gas is blown from the bottom tuyere at a rate of 0.5 to 5 $Nm^3$/molten metal ton-min.

12. The method of claim 7 or 8, wherein the Ar gas is blown from the bottom tuyere at a rate of 1 to 3 $Nm^3$/molten metal ton-min.

13. The method of claim 7 or 8, wherein the Cr molten metal is agitated for 5 to 10 minutes.

14. The method of claim 7 or 8, wherein the inert gas which is diluted with $O_2$ is Ar.

15. A method of decarburizing Cr molten metal, comprising the steps of blowing, into a Cr molten metal supported in a container having a bottom tuyere and a top lance, a decarburizing $O_2$ diluted with $N_2$ from said top lance;

blowing, into said Cr molten metal, $N_2$ gas from said bottom tuyere so as to agitate said Cr molten metal for producing stainless steel;

changing the gas which is diluted with $O_2$ from $N_2$ to Ar;

supplying a deoxidizer of Fe—Si or Al into said Cr molten metal; and agitating the Cr molten metal by blowing Ar from said bottom tuyere.

16. A method of decarburizing Cr molten metal, comprising the steps of blowing, into a Cr molten metal supported in a container having a bottom tuyere and a top lance, a decarburizing $O_2$ diluted with $N_2$ from said top lance;

blowing, into said Cr molten metal, $N_2$ gas from said bottom tuyere so as to agitate said cr molten metal for producing stainless steel;

changing the gas which is diluted with $O_2$ from $N_2$ to Ar;

maintaining a slag amount of not more than 50 Kg/molten metal ton;

supplying a deoxidizer of Fe—Si or Al into said Cr molten metal; and agitating the Cr molten metal by blowing Ar from said bottom tuyere.

17. The method of claim 14 or 15, wherein the $N_2$ gas is blow from said bottom tuyere in an amount of more than 0.5 $Nm^3$/molten metal ton-min.

18. The method of claim 14 or 15, wherein the $N_2$ gas is blow from said bottom tuyere in an amount of more than 1 $Nm^3$/molten metal ton-min.

19. The method of claim 14 or 15, wherein the Ar gas is blown from said bottom tuyere in an amount of from 0.5 to 5 $Nm^3$/molten metal ton-min.

20. The method of claim 14 or 15, wherein the Ar gas is blown from said bottom tuyere in an amount of from 1 to 3 $Nm^3$/molten metal ton-min.

21. The method of claim 14 or 15, wherein the Cr molten metal is agitated for 5 to 10 minutes.

22. The method of claim 14 or 15, wherein the gas which is diluted with $O_2$ is changed from $N_2$ to Ar, when carbon in steel becomes 0.8 to 2.0 weight percent.

23. A method of decarburizing Cr molten metal, comprising the steps of blowing, into a Cr molten metal supported in a container having a bottom tuyere and a top lance, a decarburizing $O_2$ diluted with $N_2$ from said top lance;

blowing, in said Cr molten metal, $N_2$ gas from said bottom tuyere so as to agitate said Cr molten metal for producing stainless steel;

changing the agitating gas blown from said bottom tuyere from $N_2$ to Ar;

changing the gas which is diluted with $O_2$ from $N_2$ to Ar;

supplying a deoxidizer of Fe—Si or Al into said Cr molten metal; and agitating by blowing Ar from said bottom tuyere.

24. A method of decarburizing Cr molten metal, comprising the steps of blowing, into a Cr molten metal supported in a container having a bottom tuyere and a top lance, a decarburizing $O_2$ diluted with $N_2$ from said top lance;

blowing, into said Cr molten metal, $N_2$ gas from said bottom tuyere so as to agitate said Cr molten metal for producing stainless steel;

changing the agitating gas blown from said bottom tuyere from $N_2$ to Ar;

changing the gas which is diluted with $O_2$ from $N_2$ to Ar;

maintaining a slag amount of not more than 50 Kg/molten metal ton;

supplying a deoxidizer of Fe—Si or Al into said Cr molten metal; and agitating by blowing Ar from said bottom tuyere.

25. The method of claim 23 or 24, wherein said $N_2$ gas is blown from said bottom tuyere in an amount of more than 1 $Nm^3$/molten metal ton-min.

26. The method of claim 23 or 24, wherein Ar is blown from said bottom tuyere in an amount of from 0.5 to 5 $Nm^3$/molten metal ton-min.

27. The method of claim 23 or 24, wherein Ar is blown from said bottom tuyere in an amount of from 1 to 3 $Nm^3$/molten metal ton-min.

28. The method of claim 23 or 24, wherein said Cr molten metal is agitated for a period of 5 to 10 minutes.

29. The method of claim 23 or 24, wherein the gas which is diluted with $O_2$ is changed from $N_2$ to Ar when carbon in steel becomes 0.8 to 2.0 weight percent.

* * * * *

UNITED STATES PATENT AND TRADEMARK OFFICE
CERTIFICATE OF CORRECTION

PATENT NO. : 5,047,081

DATED : September 10, 1991

INVENTOR(S) : Haruyoshi Tanabe et al

It is certified that error appears in the above-identified patent and that said Letters Patent is hereby corrected as shown below:

COLUMN 10

Claim 17, line 1, change "14 or 15" to -- 15 or 16 --
Claim 18, line 1, change "14 or 15" to -- 15 or 16 --
Claim 19, line 1, change "14 or 15" to -- 15 or 16 --
Claim 20, line 1, change "14 or 15" to -- 15 or 16 --
Claim 21, line 1, change "14 or 15" to -- 15 or 16 --
Claim 22, line 1, change "14 or 15" to -- 15 or 16 --

Signed and Sealed this

Eleventh Day of August, 1992

Attest:

DOUGLAS B. COMER

*Attesting Officer*   *Acting Commissioner of Patents and Trademarks*